United States Patent
Kim et al.

(10) Patent No.: US 6,853,573 B2
(45) Date of Patent: Feb. 8, 2005

(54) NON-VOLATILE SEMICONDUCTOR MEMORY DEVICE FOR CONNECTING TO SERIAL ADVANCED TECHNOLOGY ATTACHMENT CABLE

(75) Inventors: Seong-hyun Kim, Yongin-shi (KR); Sam-yong Bahng, Sungnam-shi (KR); Yong-hyeon Kim, Yongin-shi (KR); Tae-Keun Jeon, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 84 days.

(21) Appl. No.: 10/453,989

(22) Filed: Jun. 4, 2003

(65) Prior Publication Data

US 2004/0042244 A1 Mar. 4, 2004

(30) Foreign Application Priority Data

Sep. 2, 2002 (KR) ................................ 10-2002-0052481

(51) Int. Cl.[7] ................................................. G11C 5/06
(52) U.S. Cl. ......................................... 365/63; 365/221
(58) Field of Search ..................... 365/63, 221, 189.01; 710/8

(56) References Cited

U.S. PATENT DOCUMENTS

| | | | | |
|---|---|---|---|---|
| 6,791,779 | B1 | * 9/2004 | Singh et al. | 360/55 |
| 6,807,600 | B2 | * 10/2004 | Bissessur et al. | 710/313 |
| 2003/0191872 | A1 | * 10/2003 | Barth et al. | 710/8 |
| 2004/0044802 | A1 | * 3/2004 | Chiang et al. | 710/1 |

* cited by examiner

*Primary Examiner*—Anh Phung
(74) *Attorney, Agent, or Firm*—Mills & Onello LLP

(57) ABSTRACT

A serial advanced technology attachment (SATA) storage device supports an SATA protocol that provides for high data transfer speed. The storage device is for connecting to an SATA cable, and includes at least one non-volatile semiconductor memory device for storing data therein; an SATA adapter, connected to the SATA cable, for transferring/receiving data signals to/from the SATA cable; a memory controller for controlling the non-volatile semiconductor memory device in response to data signals transferred from the SATA adapter; and an SATA device controller, connected between the SATA adapter and the memory controller, for interfacing transmitted/received data signals between the SATA adapter and the memory controller.

4 Claims, 3 Drawing Sheets

NON-VOLATILE SEMICONDUCTOR MEMORY DEVICE FOR CONNECTING TO SERIAL ADVANCED TECHNOLOGY ATTACHMENT CABLE

FIELD OF THE INVENTION

The present invention relates to a semiconductor memory device and, more particularly, to a non-volatile memory device that is connected to a host platform by means of a serial advanced technology attachment (SATA) interface.

BACKGROUND OF THE INVENTION

In the past, non-volatile semiconductor memories were in the form of read only memories (ROMs). Once data is written to a ROM, the written data can only be read out. Data could not be written to, or erased, from such devices. Recent development of erasable programmable read only memories (EPROMs) amounted to the turning point of non-volatile semiconductor memories, since they provide for full utility, as they are writable, readable, and erasable memories. With the benefit of compactness, low power consumption, and high stability, such non-volatile semiconductor memories have been widely applied to portable electronic equipment such as digital cameras and personal digital assistants (PDA).

In recent years, applications of non-volatile semiconductor memory devices have increased remarkably. Accordingly, there is a demand for high-speed and high-capacity non-volatile semiconductor memory devices. To utilize such non-volatile memory devices, an interface supporting a high data transfer speed is mandatory.

The "Serial Advanced Technology Attachment (ATA) Specification Version 1.1" (hereinafter referred to as "SATA") is a form of interface standardized by the electronics industry, including APT Technology, DELL Computer, IBM, Intel, Maxtor, Seagate Technology, and so forth. The SATA interface is commonly employed in mass storage devices such as hard disk drives. SATA presently supports a first generation data transfer speed of 1.5 Gbps but is expected to support a third generation data transfer speed of 6.0 Gbps. The SATA interface has the same application level as an existing ATA interface such as extended-integrated drive electronics (E-IDE), enabling ATA-based software to operate directly in the SATA interface.

SUMMARY OF THE INVENTION

The present invention provides for a non-volatile semiconductor memory device to be connected to a serial ATA (SATA) cable which is an interface supportive of high data transfer speeds.

In one embodiment, a serial advanced technology attachment (SATA) storage device for connecting to an SATA cable includes at least one non-volatile semiconductor memory for storing data therein; an SATA adapter, connected to the SATA cable, for transferring/receiving data signals to/from the SATA cable; a memory controller for controlling the non-volatile semiconductor memory in response to the data signals transferred from the SATA adapter; and an SATA device controller, connected between the SATA adapter and the memory controller, for interfacing transmitted/received signals between the SATA adapter and the memory controller.

The SATA connector and the SATA device controller may include a serial physical interface plant block for converting electrical signals received via the SATA cable into logical signals; a serial digital transport link block for receiving the logic signals from the serial physical interface plant block to process the logical signals to generate data suitable for SATA protocol communication; and a serial digital transport control block, connected between the serial digital transport link block and the memory controller, for interfacing the data transmission/reception between the serial digital transport link block and the memory controller.

The serial digital transport control block includes a shadow register block for generating control values which are necessary for the transfer of write/read data to/from the non-volatile semiconductor memory.

The memory controller includes a reader for reading the control values stored in the shadow register block; a command detector for detecting a command from the control values read out by the reader; a setter for setting a special function register in response to the command detected by the command detector in order to correspond to the control values stored in the shadow register block a memory interface block for controlling data writing/reading/erasing operations in the non-volatile semiconductor memory based upon the set content in the special function register; and a data handler, connected between the shadow register block and the memory interface block, for managing data to be written in the non-volatile semiconductor memory or data read out from the non-volatile semiconductor memory.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
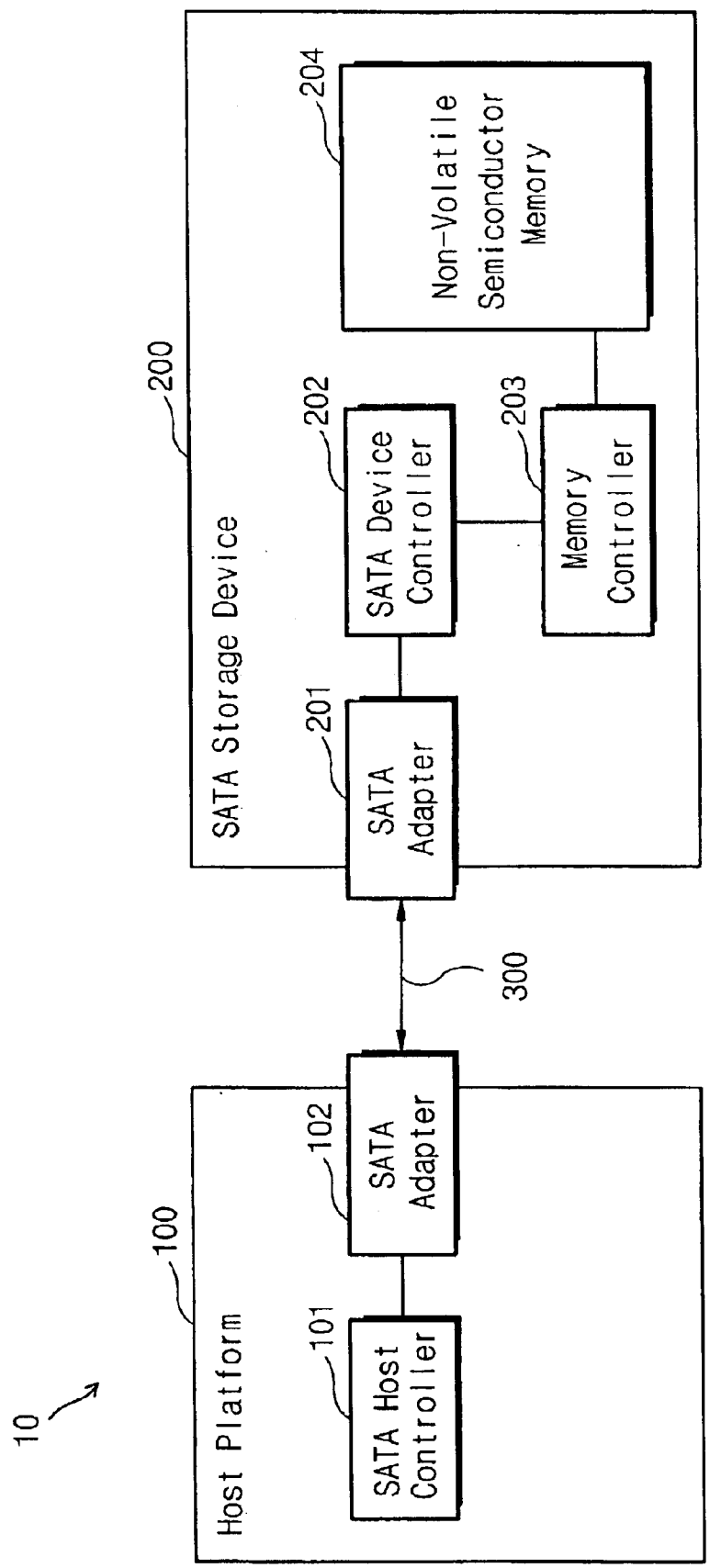
FIG. 1 is a block diagram of the interconnection of a non-volatile memory device with a host system according to the present invention.

A non-volatile semiconductor memory device connected with a host system according to the present invention is illustrated in FIG. 1.

Referring to FIG. 1, a memory system 10 includes a host platform 100 in communication with an SATA-based storage device 200. The host platform 100 comprises, for example, a type of electronic equipment, for example, PDA, digital camera, computer system, cellular phone, etc., that requires a data storage device.

The host platform 100 is connected to the SATA storage device 200 through an SATA cable 300. The host platform 100 is connected to the SATA cable 300 through an SATA host adapter 102. The SATA storage device 200 is connected to the SATA cable 300 through an SATA device adapter 201. The host platform 100 further includes a host controller 101 for controlling and managing all SATA-protocol transfers on the SATA cable 300.

The SATA storage device 200 includes an SATA device controller 202 for supplying the interface between the SATA storage device 200 and the SATA cable 300. The memory controller 203 writes/reads data to/from a non-volatile semiconductor memory device 204. The non-volatile semiconductor memory device 204 includes, for example, an array of memory modules for storing data therein.

Figure 2:
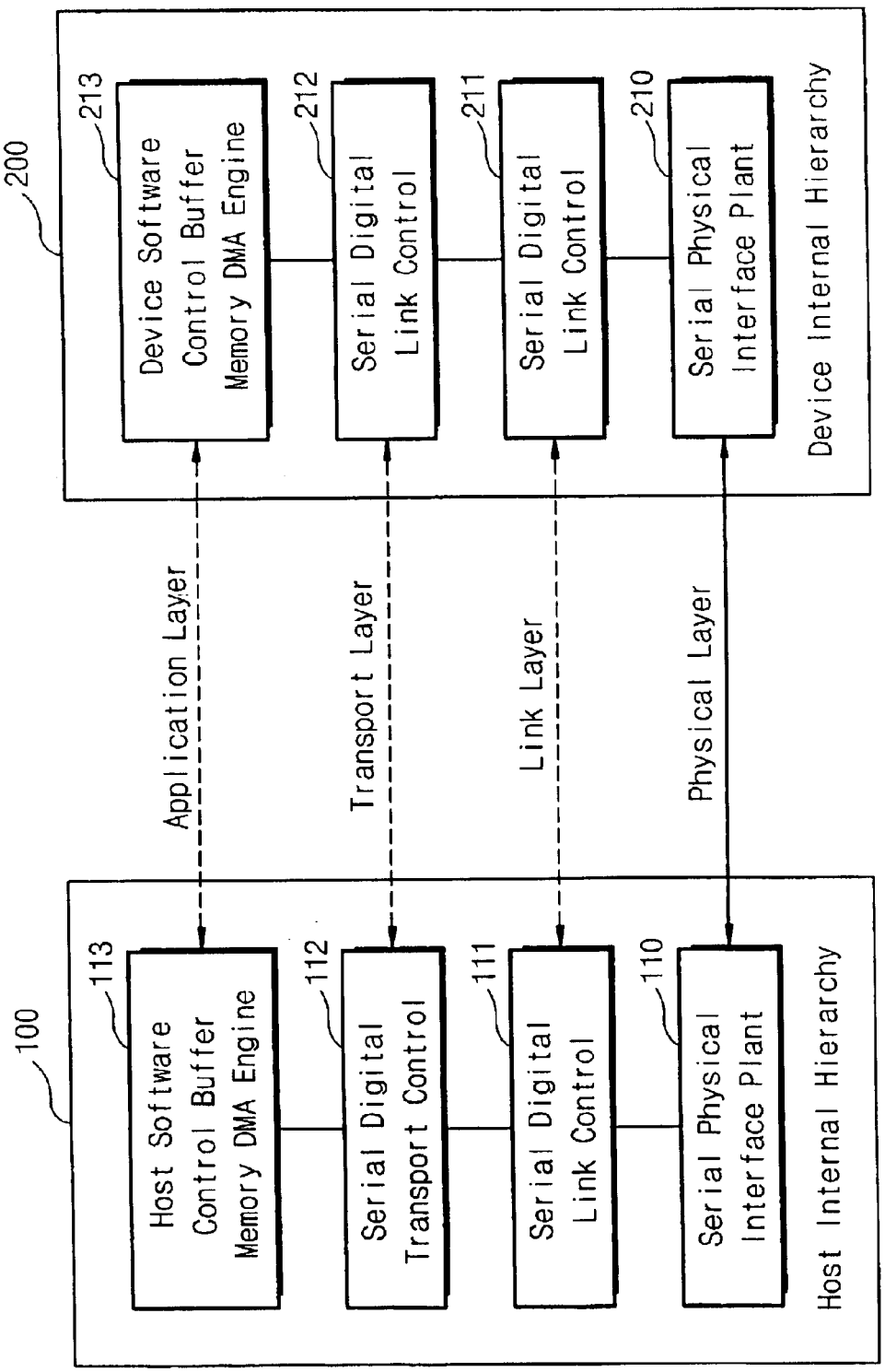
FIG. 2 is a block diagram of the SATA communication hierarchy.

SATA communication hierarchy is now described with reference to FIG. 2. In FIG. 2, the solid line associated with the "Physical Layer" denotes the physical connection of a host platform 100 with an SATA storage device 200, and dotted lines associated with the "Link Layer, Transport Layer, and Application Layer" denote the logical connection thereof. In this manner, the host platform 100 and the SATA storage device 200 hierarchically correspond to each other. It will be understood that layers 110–113 of the host platform 100 are described below but layers 210–213 of the SATA storage device 200 are equivalently applied thereto.

Blocks that perform significant operations in the communication based on an SATA protocol include the serial digital transport control block 112 and a serial digital link control block 111. The serial digital link control block 111 controls the operation associated with a serial line, and the serial digital transport control block 112 controls the operation associated with the host platform 100.

A serial physical interface plant block 110 includes an adapter 102 (see FIG. 1) that is connected to an SATA cable 300. The serial physical interface plant block 110 operates to convert an electrical serial signal into logical parallel data, and vice-versa.

The serial digital link control block 111 operates to control the physical interface plant block 110 that is a physical layer and takes charge of the interface for the serial digital transport control block 112 that is a transport layer. The serial digital link control block 111, for example, performs 8 bits/10 bits encoding, scrambling, and cyclic redundancy checking (CRC) to secure serial line transmission.

The serial digital transport control block 112 functions to construct and decompress a frame information structure (FIS). The FIS is a frame constructed for transmitting a command from a host software control buffer memory DMA engine block 113 that lies in the application layer. In the serial digital transport control block 112, an error report is provided to the application layer 113 and the link layer 111 and data transmission/reception is controlled.

The SATA storage device 200 of FIG. 2 is now explained in detail with reference to FIG. 3.

Figure 3:
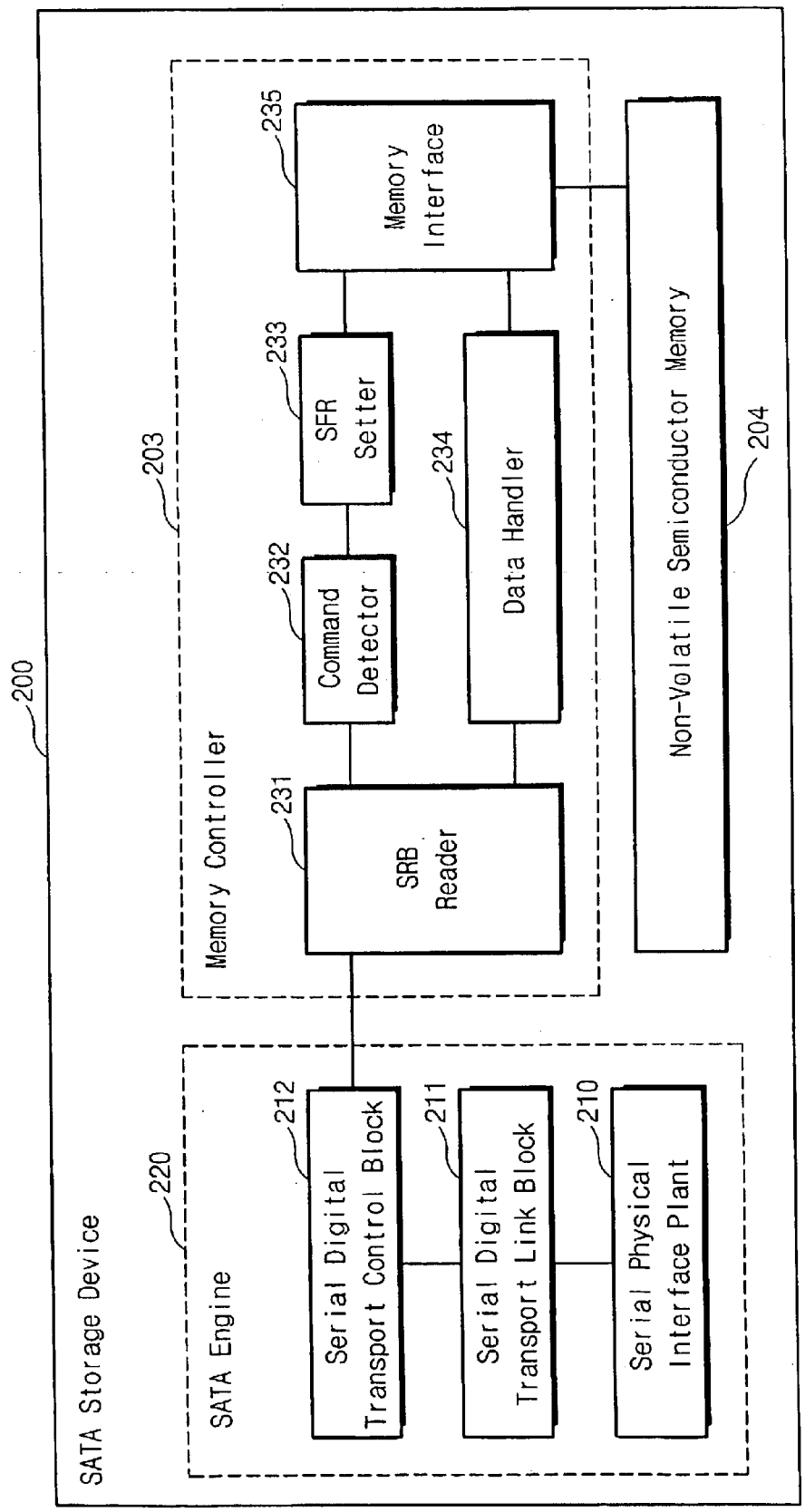
FIG. 3 is a detailed functional block diagram of the SATA storage device.

Referring to FIG. 3, the SATA storage device 200 includes an SATA engine 220 corresponding to the SATA adapter 201 and the SATA device controller 202 which are illustrated in FIG. 1. The SATA engine 220 has, for example, the SATA communication hierarchy of FIG. 2, i.e., the serial physical interface block 210, the serial digital link control block 211, and the serial digital transport control block 212. Each of the blocks 210–212 have, for example, the same function as that previously stated with respect to the host platform 100 of FIG. 2.

A memory controller 203 corresponds to the application layer 213 and includes a shadow register block (SRB) reader 231, a command detector 232, a special function register (SFR) setter 233, a data handler 234, and a memory interface 235.

The memory controller 203 is connected to the serial digital transport control block 212 through a shadow register block (SRB) embedded in the serial digital transport control block 212. The serial digital transport control block 212 stores data in the shadow register block (SRB) depending on the construction and decompression of the frame information structure (FIS). The SRB reader 231 reads out data stored in a shadow register block (not shown) and transfers status information of the non-volatile semiconductor memory 204 to the serial digital transport control block 212 so that the status information may be stored in the shadow register block. The following Table 1 exhibits the data stored in the shadow register block.

TABLE 1

| OFFSET | READ | WRITE |
| --- | --- | --- |
| 0 | | Data Port |
| 1 | Error | Features |
| 2 | | Sector Count |
| 3 | | Sector Number |
| 4 | | Cylinder Low |
| 5 | | Cylinder High |
| 6 | | Device/Head |
| 7 | Status | Command |
| Eh | Alternate Status | Device Control |

As shown in Table 1, the shadow register block possesses all values that are necessary to write/read data to/from the non-volatile memory 204. Accordingly, it is appreciated that all operations of the memory controller 203 are initiated by reading values stored in the shadow register block.

The command detector 232 detects the type of command that is included in the content read out from the SRB reader 231. The SFR setter 233 sets data of a special function register (SFR) depending on the command detected by the command detector 232 in order to correspond to the data in the shadow register block. The data handler 234 carries out error control coding (ECC) for data excepting control signals and manages data to be stored in the non-volatile semiconductor memory 204 or data read out from the non-volatile semiconductor memory 204. The memory interface block 235 writes/reads data to/from the non-volatile semiconductor memory 204 or erases data therefrom.

The foregoing functional blocks may be implemented in a variety of configurations, including, for example, software-based configurations, hardware-based configurations, and all combinations thereof.

According to the present invention, it is possible to realize an SATA non-volatile semiconductor memory device that is supportive of an SATA protocol interface capable of data transfer at high data rates.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A serial advanced technology attachment (SATA) storage device for connecting to an SATA cable, comprising:

at least one non-volatile semiconductor memory device for storing data therein;

an SATA adapter for transferring data signals over the SATA cable, the SATA adapter being connected to the SATA cable;

a memory controller for controlling the non-volatile semiconductor memory device in response to the data signals transferred at the SATA adapter; and an SATA device controller connected between the SATA adapter and the memory controller for interfacing the data signals between the SATA adapter and the memory controller.

2. The SATA storage device of claim 1 wherein the SATA adapter and the SATA device controller comprise:
- a serial physical interface plant block for converting electrical signals transferred over the SATA cable into logical signals;
- a serial digital transport link block for receiving the logical signals from the serial physical interface plant block to process logical signals to generate data suitable for SATA protocol communication; and
- a serial digital transport control block for interfacing between the serial digital transport link block and the memory controller, the serial digital transport control block being connected between the serial digital transport link block and the memory controller.

3. The SATA storage device of claim 2, wherein the serial digital transport control block includes a shadow register block for generating control values which are necessary for the transfer of data to and from the non-volatile semiconductor memory device.

4. The SATA storage device of claim 3, characterized wherein the memory controller comprises:
- a reader for reading the control values stored in the shadow register block;
- a command detector for detecting a command from the control values read by the reader;
- a setter for setting a special function register in response to the command detected by the command detector to correspond to the control values stored in the shadow register block;
- a memory interface block for controlling data writing/reading/erasing operations in the non-volatile semiconductor memory device based upon the settings of the special function register; and
- a data handler for managing data to be written into the non-volatile semiconductor memory device or data read out from the non-volatile semiconductor memory device, the data handler being connected between the shadow register block and the memory interface block.

* * * * *